(12) United States Patent
Kakita et al.

(10) Patent No.: US 10,604,849 B2
(45) Date of Patent: Mar. 31, 2020

(54) METHOD OF PRODUCING HOT-STAMPED ARTICLE

(71) Applicant: TOYOTA JIDOSHA KABUSHIKI KAISHA, Toyota-shi, Aichi-ken (JP)

(72) Inventors: Takeshi Kakita, Toyota (JP); Kohei Hisada, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 447 days.

(21) Appl. No.: 15/100,808

(22) PCT Filed: Nov. 27, 2014

(86) PCT No.: PCT/IB2014/002777
§ 371 (c)(1),
(2) Date: Jun. 1, 2016

(87) PCT Pub. No.: WO2015/082993
PCT Pub. Date: Jun. 11, 2015

(65) Prior Publication Data
US 2016/0298239 A1   Oct. 13, 2016

(30) Foreign Application Priority Data

Dec. 2, 2013   (JP) .................................. 2013-249033

(51) Int. Cl.
*B08B 7/00* (2006.01)
*C23C 22/78* (2006.01)
(Continued)

(52) U.S. Cl.
CPC ............ *C23C 22/68* (2013.01); *B21D 22/022* (2013.01); *B23K 26/352* (2015.10);
(Continued)

(58) Field of Classification Search
CPC .............. C23C 22/07–18; C23C 22/78; B08B 7/0042–0057
See application file for complete search history.

(56) References Cited

U.S. PATENT DOCUMENTS 4,063,063 A * 12/1977 Funck .................. B08B 7/0042
134/1
2006/0121305 A1   6/2006 Yoshikawa et al.
(Continued)

FOREIGN PATENT DOCUMENTS

CN   1809650 A   7/2006
EP   0927595 A1   7/1999
(Continued)

OTHER PUBLICATIONS

Karbasian et al., "A review on hot stamping", Journal of Materials Processing Technology, vol. 210, No. 15, 2010, pp. 2103-2118, XP 055141086.

*Primary Examiner* — Lois L Zheng
(74) *Attorney, Agent, or Firm* — Sughrue Mion, PLLC

(57) ABSTRACT

A method of producing a hot-stamped article includes: a forming process of heating a galvanized steel sheet (1) on which a galvanized layer (12) is formed and forming the heated galvanized steel sheet (1) by hot stamping; a removal process of irradiating, after the forming step, an oxide film (13) formed on a surface of the galvanized layer (12) with laser light to remove the oxide film (13); and a coating process of performing, after the removal process, a coating treatment on the galvanized steel sheet (1) formed by hot stamping.

2 Claims, 8 Drawing Sheets

(51) Int. Cl.
    *C23C 22/68*     (2006.01)
    *C23G 5/00*     (2006.01)
    *C23C 2/26*     (2006.01)
    *C21D 7/13*     (2006.01)
    *B23K 26/40*     (2014.01)
    *B23K 26/361*     (2014.01)
    *B23K 26/352*     (2014.01)
    *B21D 22/02*     (2006.01)
    *C23C 2/06*     (2006.01)
    *C23C 2/28*     (2006.01)
    *C23C 2/40*     (2006.01)
    *C25D 3/22*     (2006.01)
    *C25D 5/50*     (2006.01)
    *C23C 22/07*     (2006.01)
    *C21D 9/46*     (2006.01)
    *C25D 7/06*     (2006.01)
    *B23K 101/34*     (2006.01)

(52) U.S. Cl.
    CPC ............ *B23K 26/361* (2015.10); *B23K 26/40* (2013.01); *C21D 7/13* (2013.01); *C23C 2/06* (2013.01); *C23C 2/26* (2013.01); *C23C 2/28* (2013.01); *C23C 2/40* (2013.01); *C23C 22/78* (2013.01); *C23G 5/00* (2013.01); *C25D 3/22* (2013.01); *C25D 5/50* (2013.01); *B08B 7/0042* (2013.01); *B23K 2101/35* (2018.08); *C21D 9/46* (2013.01); *C25D 7/0614* (2013.01)

(56) References Cited

U.S. PATENT DOCUMENTS

| | | | | |
|---|---|---|---|---|
| 2012/0267012 | A1* | 10/2012 | Sohn | C23C 2/02 |
| | | | | 148/284 |
| 2013/0292009 | A1* | 11/2013 | Hayashi | C21D 8/0226 |
| | | | | 148/518 |
| 2014/0342181 | A1* | 11/2014 | Mutschler | C23C 2/28 |
| | | | | 428/659 |
| 2014/0367982 | A1* | 12/2014 | Kano | B60R 19/18 |
| | | | | 293/121 |

FOREIGN PATENT DOCUMENTS

| | | |
|---|---|---|
| EP | 1630244 A1 | 3/2006 |
| JP | 2000-263259 A | 9/2000 |
| JP | 2003-073774 A | 3/2003 |
| JP | 2004-323897 A | 11/2004 |
| JP | 2008223085 A | 9/2008 |
| JP | 2012-025977 A | 2/2012 |

* cited by examiner

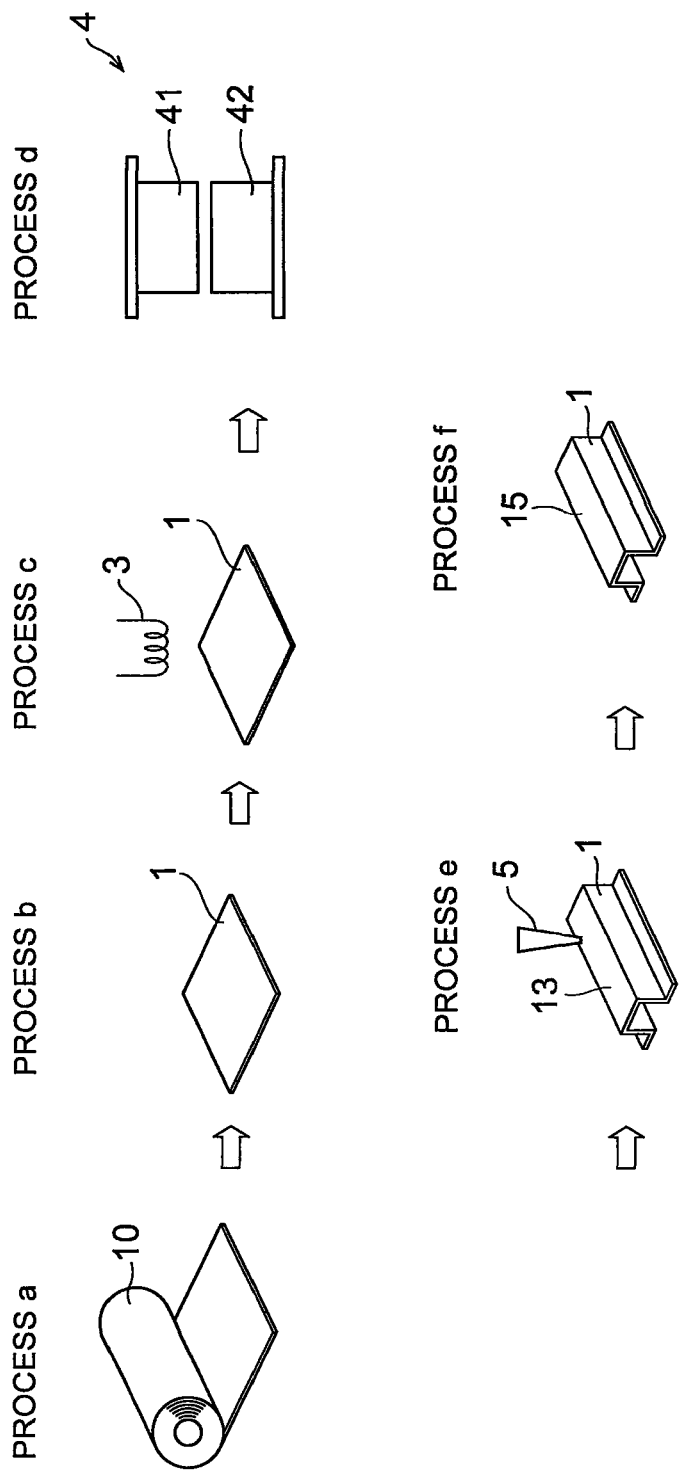

METHOD OF PRODUCING HOT-STAMPED ARTICLE

BACKGROUND OF THE INVENTION

1. Field of the Invention

The present invention relates to a method of producing a hot-stamped article formed by hot stamping on which a coating treatment can be suitably performed.

2. Description of Related Art

Recently, in the automobile industry, a high tensile strength steel sheet has been commonly used for improving collision safety and reducing the weight of a vehicle to improve fuel efficiency. However, when the strength of steel to be used increases, galling or rupture of a steel sheet may occur during press-forming, or the shape of a formed article may be unstable due to the spring-back phenomenon.

As a technique of producing a high-strength article, hot press-forming (hot stamping) in which a high strength steel sheet is not simply pressed (cold pressing) but is press-formed in a low-strength state such as a heating state is adopted.

In hot stamping, a steel sheet is pressed in a state of being heated to an austenite transformation temperature range of 800° C. or higher to be softened. At the same time, the quenching of the steel sheet is strengthened with a cooling effect (contact cooling) obtained by contact with dies. As a result, since the strength of a pressed article is improved and the residual stress thereof decreases, the sensibility of season cracking, delayed fracture, and the like which are problems of a high tensile strength steel sheet also decreases.

However, a galvannealed steel sheet is superior in strength, weldability, coating properties, and the like and thus is used as a steel sheet for a vehicle body. When such a galvannealed steel sheet is used, a coating treatment is performed on the surface thereof.

In this coating treatment, for example, phosphating is performed as a surface treatment, and a coating film is formed on a phosphate crystal film. In order to perform phosphating, it is important to form a superior phosphate crystal film from the viewpoints of securing superior coating performance such as adhesion and corrosion resistance of a coating film. In particular, a galvannealed steel sheet is formed of a Zn—Fe alloy, which is highly reactive with a phosphating solution, and contains substantially no impurities and the like. Thus, a superior phosphate crystal film can be formed.

However, even in this case, an oxide is formed on the surface of the steel sheet because hot stamping is typically performed in the atmosphere. This oxide is formed as a zinc-based oxide film. When this oxide film is formed, the adhesion of a coating film (in particular, the adhesion of a phosphate crystal film) may decrease.

From this point of view, for example, a method of producing a hot-stamped article is disclosed, the method including: a hot press-forming process of performing hot press-forming (hot stamping) on a galvanized steel sheet on which a galvanized layer is formed; and a zinc oxide layer removal process of removing, by shot blasting, a zinc oxide layer of the galvanized layer which is formed on the surface of the galvanized steel sheet through a heating process (for example, refer to Japanese Patent Application Publication No. 2012-25977 (JP 2012-25977 A)).

In this way, the adhesion of a coating film can be improved by removing a zinc oxide layer (oxide film). However, according to an experiment described below by the present inventors, there may be a case where, even if the above-described shot-blasting is performed to remove an oxide film, a part of the oxide film is crushed and remains in a steel sheet. As a result, the adhesion of a coating film may be insufficient. In addition, a part of a plating film may be peeled off and corrosion protection performance of the plating film may decrease. In addition, compressive residual stress is applied to a product by collision between shot particles, which may deform the product.

SUMMARY OF THE INVENTION

The invention provides a method of producing a hot-stamped article in which the adhesion of a coating film can be improved by efficiently removing an oxide film.

Here, as a result of thorough investigation, the present inventors have found the following reason why the adhesion of a coating film decreases. Specifically, in order to produce a hot-stamped article from a galvanized steel sheet, the galvanized steel sheet is formed after being heated to the austenite transformation temperature range (800° C. or higher) of steel which is the base material. At this time, as illustrated in FIG. 9A, an oxide film 93 is formed on a surface of a galvanized layer 92 of a galvanized steel sheet 9.

Next, as illustrated in FIG. 9B, in the galvanized steel sheet 9 which is cooled after forming, gaps C are formed between the oxide film 93 and the galvanized layer 92 due to a difference in cubical expansion coefficient between the oxide film 93 and the galvanized layer 92.

Here, in particular, when a chemical conversion treatment is performed, a crystallized chemical conversion film 94 is formed on a surface of the oxide film 93. However, the deposition amount of crystals constituting the chemical conversion film 94 decreases as compared to a case where the oxide film 93 is not formed. When a galvannealed steel sheet such as Galvalume steel sheet is used, an Al oxide is formed in an oxide film, which causes a decrease in the deposition amount of crystals described above and a decrease in the adhesion of a coating film.

Next, even if a coating film 95 is further formed by electrodeposition coating or the like as illustrated in FIG. 9B, an adhesive force is maintained between the oxide film 93 and the coating film 95, but the gaps C are still present between the oxide film 93 and the galvanized layer 92.

Next, in a usage environment, as illustrated in FIG. 9C, water W or the like containing salt content penetrates the oxide film 93 and infiltrates into the gaps C between the oxide film 93 and the galvanized layer 92. As a result, corrosion is developed in this space. Further, a region around the gaps C is alkalized, and the peeling of the coating film propagates from the gaps C.

In consideration of this point, it is preferable to reliably remove an oxide film in which gaps are formed with the galvanized layer, and as means for removing the oxide film, the present inventors have focused on a technique of sublimating the oxide film by laser heating.

According to an aspect of the invention, there is provided a method of producing a hot-stamped article, the method including: a forming process of heating a galvanized steel sheet on which a galvanized layer is formed and forming the heated galvanized steel sheet by hot stamping; a removal process of irradiating, after the forming process, an oxide film formed on a surface of the galvanized layer with laser light to remove the oxide film; and a coating process of performing, after the removal process, a coating treatment on the galvanized steel sheet formed by hot stamping.

According to the aspect of the invention, the oxide film, which is formed on the surface of the galvanized steel sheet when the galvanized steel sheet is formed by hot stamping, is sublimated (evaporated) by laser light. Therefore, the oxide film can be more efficiently removed from the surface of the galvanized steel sheet. In particular, heat is rapidly input to an oxide film of a portion floating above a gap by laser light. Therefore, the oxide film can be easily removed.

As a result, during hot stamping, even if an interface is peeled off and the gaps are formed due to a difference in cubical expansion coefficient between the oxide film and the galvanized layer, the gaps can be eliminated by removing the oxide film, which is the cause for the formation of the gaps, with laser light.

In addition, according to the aspect of the invention, the oxide film is evaporated (sublimated) by irradiation of laser light and thus can be uniformly removed without being crushed unlike oxide film removal by shot blasting or mechanical polishing. In addition, since the oxide film is removed by laser light, the surface of the galvanized steel sheet is rapidly heated and cooled. Accordingly, an effect of the laser light on the base material of the galvanized steel sheet can be minimized.

In the coating process, a phosphate chemical conversion treatment may be performed on the surface of the galvanized layer from which the oxide film is removed, and a coating film may be formed on the surface on which the phosphate chemical conversion treatment is performed. As a result, since the oxide film is removed by irradiation of laser light, the deposition amount of phosphate crystals, which constitute the chemical conversion film, on the galvanized layer can be increased.

According to the aspect of the invention, the adhesion of a coating film can be improved by efficiently removing an oxide film.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a diagram illustrating a method of producing a hot-stamped article according to an embodiment of the invention;

DETAILED DESCRIPTION OF EMBODIMENTS

Hereinafter, the invention will be described based on an embodiment with reference to the drawings. FIG. 1 is a diagram illustrating a method of producing a hot-stamped article according to an embodiment of the invention, in which Process a is a process of preparing a material which is a galvanized steel sheet, Process b is a process of cutting the galvanized steel sheet into a sheet, Process c is a process of heating the galvanized steel sheet, Process d is a forming process, Process e is an oxide film removal process, and Process f is a coating process.

Figure 2A:
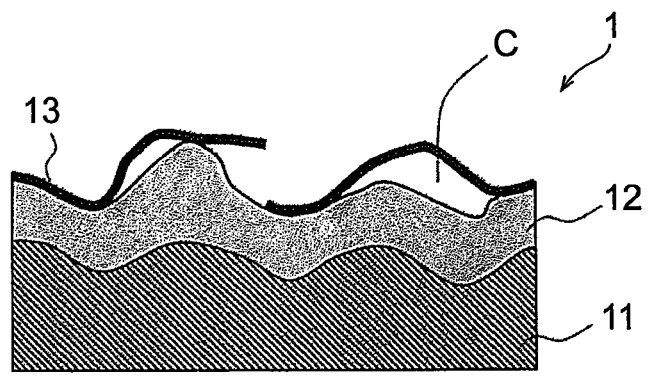
FIG. 2A is a schematic cross-sectional diagram illustrating a galvanized steel sheet after a forming process which is Process b of FIG. 1.
Figure 2B:
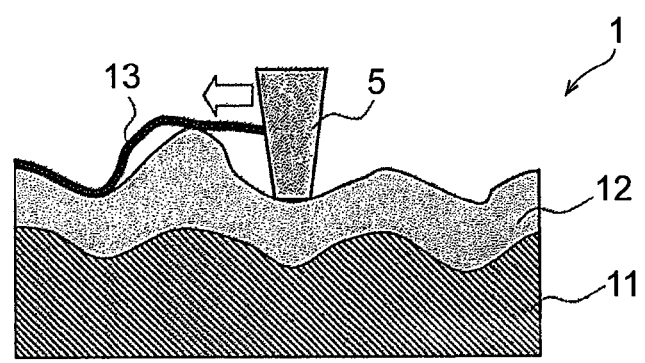
FIG. 2B is a schematic cross-sectional diagram illustrating the galvanized steel sheet in an oxide film removal process which is Process e of FIG. 1.
Figure 2C:
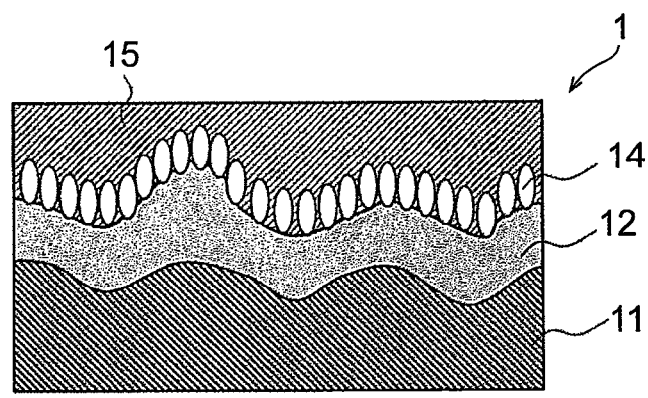
FIG. 2C is a schematic cross-sectional diagram illustrating the galvanized steel sheet after a coating process which is Process f of FIG. 1.

FIG. 2A is a schematic cross-sectional diagram illustrating a galvanized steel sheet after a forming process which is Process d of FIG. 1, FIG. 2B is a schematic cross-sectional diagram illustrating the galvanized steel sheet in an oxide film removal process which is Process e of FIG. 1, and FIG. 2C is a schematic cross-sectional diagram illustrating the galvanized steel sheet after a coating process which is Process f of FIG. 1.

As illustrated in Process a of FIG. 1, first, a coil material 10 is prepared which is formed of a galvanized steel sheet in which a galvanized layer is formed on a steel sheet such as a boron steel sheet. As a galvanized steel sheet 1, for example, a hot dip galvanized steel sheet or an electrolytic galvanized steel sheet can be used. For example, as the hot dip galvanized steel sheet, a galvannealed steel sheet such as a hot-dip aluminum-zinc alloy plated steel sheet including Galvalume steel sheet can be used.

As illustrated in Process b of FIG. 1, the sheet-shaped galvanized steel sheet 1 is cut from the coil material 10. Next, as illustrated in Process c of FIG. 1, the galvanized steel sheet 1 is heated to the austenite transformation temperature range (800° C. or higher).

Next, as illustrated in Process d of FIG. 1, the heated galvanized steel sheet 1 is formed by hot stamping using a forming apparatus 4 including an upper die 41 and a lower die 42 (forming process). During the hot stamping, the galvanized steel sheet 1 is pressed using the forming apparatus 4 in a state of being softened. At the same time, the quenching of the galvanized steel sheet 1 can be strengthened with a cooling effect (contact cooling) obtained by contact with the upper die 41 and the lower die 42.

At this time, as illustrated in FIG. 2A, an oxide film 13 is formed on a surface of the galvanized layer 12 heated in the atmosphere. In the galvanized steel sheet 1 which is cooled after forming, the above-described gaps C are formed between the oxide film 13 and the galvanized layer 12 due to a difference in cubical expansion coefficient between the oxide film 13 and the galvanized layer 12.

Therefore, as illustrated in Process e of FIG. 1 and FIG. 2B, before performing a coating treatment described below on the galvanized steel sheet 1, the oxide film 13 formed on the surface of the galvanized layer 12 in the forming process is irradiated with laser light 5 to remove the oxide film 13.

Accordingly, the oxide film 13, which is formed on the surface of the galvanized layer 12 when the galvanized steel sheet 1 is formed by hot stamping, is sublimated (evaporated) by laser light. Therefore, the oxide film 13 can be more efficiently removed from the surface of the galvanized steel sheet 1.

In this way, as illustrated in FIG. 2C, during hot stamping, even if an interface is peeled off and the gaps C are formed due to a difference in cubical expansion coefficient between the oxide film 13 and the galvanized layer 12, the gaps C can be eliminated by removing the oxide film, which is the cause for the formation of the gaps C, with the laser light 5.

Here, as clearly seen from Examples described below by the present inventors, when the oxide film is removed by mechanical means such as shot blasting or polishing, the oxide film may be crushed and a part of the oxide film including the gaps may remain in the steel sheet. Further, when the oxide film is removed by chemical means such as etching using an etching solution, it is difficult to efficiently remove only the oxide film. In particular, since fine convex portions on the surface of the galvanized steel sheet are preferentially removed, it is difficult to uniformly remove the oxide film.

However, according to the embodiment, the oxide film 13 is evaporated (sublimated) by irradiation of the laser light 5 and thus can be uniformly removed without being crushed unlike the oxide film removal by the mechanical means and the chemical means. In addition, since the oxide film 13 is removed by the laser light 5, the surface of a base material 11 of the galvanized steel sheet 1 is rapidly heated and cooled. Accordingly, an effect of the laser light 5 on the base material of the galvanized steel sheet 1 can be minimized. Further, the effect of the laser light 5 on the base material can be reduced by appropriately controlling the power of the laser light 5.

Next, as illustrated in Process f of FIG. 1 and FIG. 2C, a phosphate chemical conversion treatment (surface treatment for coating) is performed on the surface of the galvanized layer 12 from which the oxide film 13 is removed, and a phosphate chemical conversion film 14 is formed thereon. Next, a coating film 15 is formed by electrodeposition coating on a surface of the phosphate chemical conversion film 14, thereby producing a hot-stamped article.

When the hot-stamped article is produced using the above-described method, the oxide film 13 is irradiated with the laser light 5 to remove the oxide film 13. Therefore, the deposition amount of phosphate crystals, which constitute the phosphate chemical conversion film 14, on the galvanized layer can be increased.

In addition, since the gaps C are not present in the galvanized steel sheet 1, the coating film 15 (specifically, the phosphate chemical conversion film 14) and the galvanized layer 12 come into close contact with each other. Accordingly, water or the like containing a salt content does not infiltrate into the gaps C, and corrosion is not developed.

In addition, by removing elements of the oxide film which cause electrical non-uniformity, the steel sheet is electrically stable, and corrosion resistance can be improved. Further, as compared to a case where the oxide film 13 is formed, the deposition amount of phosphate crystals constituting the phosphate chemical conversion film 14 can be increased, and the adhesion of the coating film 15 can be improved.

Example 1

<Hot Stamping>

As a galvanized steel sheet; a steel sheet (coating weight: 50 g/m$^2$) on which a galvannealed coating was formed on a surface of 22MnB5 steel was prepared. Here, a solution obtained in a coating weight measuring test according to JIS H 401 was analyzed by ICP, and the weight of Zn was measured. As a result, it was found that the weight of Zn was 30 g/m$^2$. This galvanized steel sheet was held at a heating temperature of 900° C. for 10 seconds and was quenched at a forming and quenching temperature of 700° C. or lower (specifically, a die temperature of 20° C.).

<Removal of Oxide Film>

Figure 3:
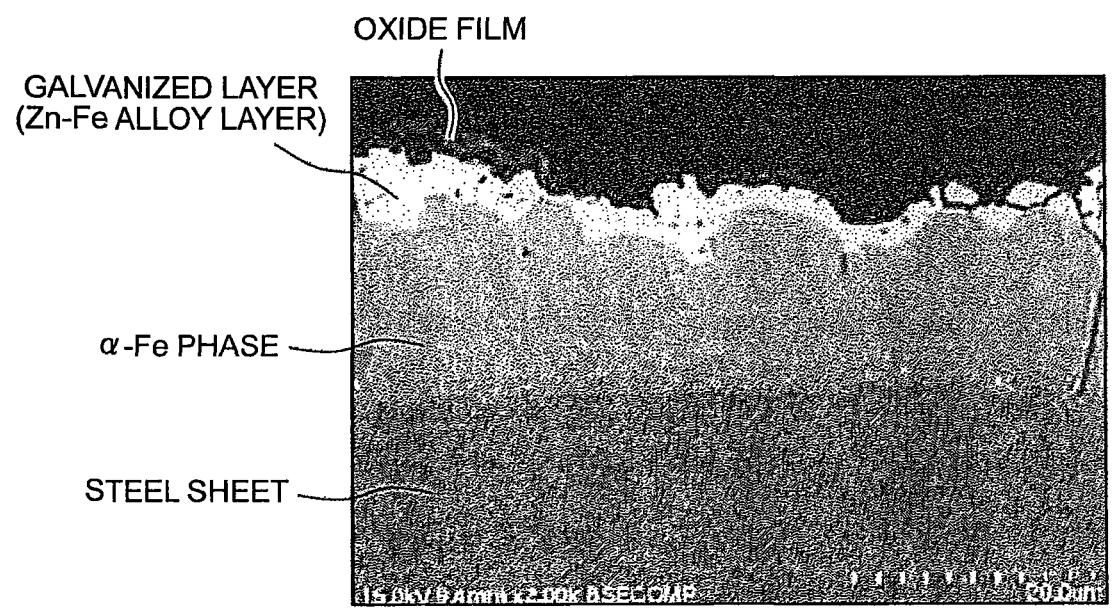
FIG. 3 is a cross-sectional image illustrating a galvanized steel sheet according to Example 1 after hot stamping (after heating)

FIG. 3 is a cross-sectional image illustrating a galvanized steel sheet according to Example 1 after hot stamping (after heating). As illustrated in FIG. 3, an oxide film (20 μm or less) was formed on a surface of a galvanized layer (Zn—Fe alloy layer). Gaps were formed between the oxide film and the galvanized layer. A Fe—Zn solid solution layer was formed below the galvanized layer. Next, the surface of the galvanized steel sheet on which the oxide film was formed was irradiated with laser light under a condition of 300 MW/cm$^2$ as shown in Table 2 to remove the oxide film.

Figure 4:
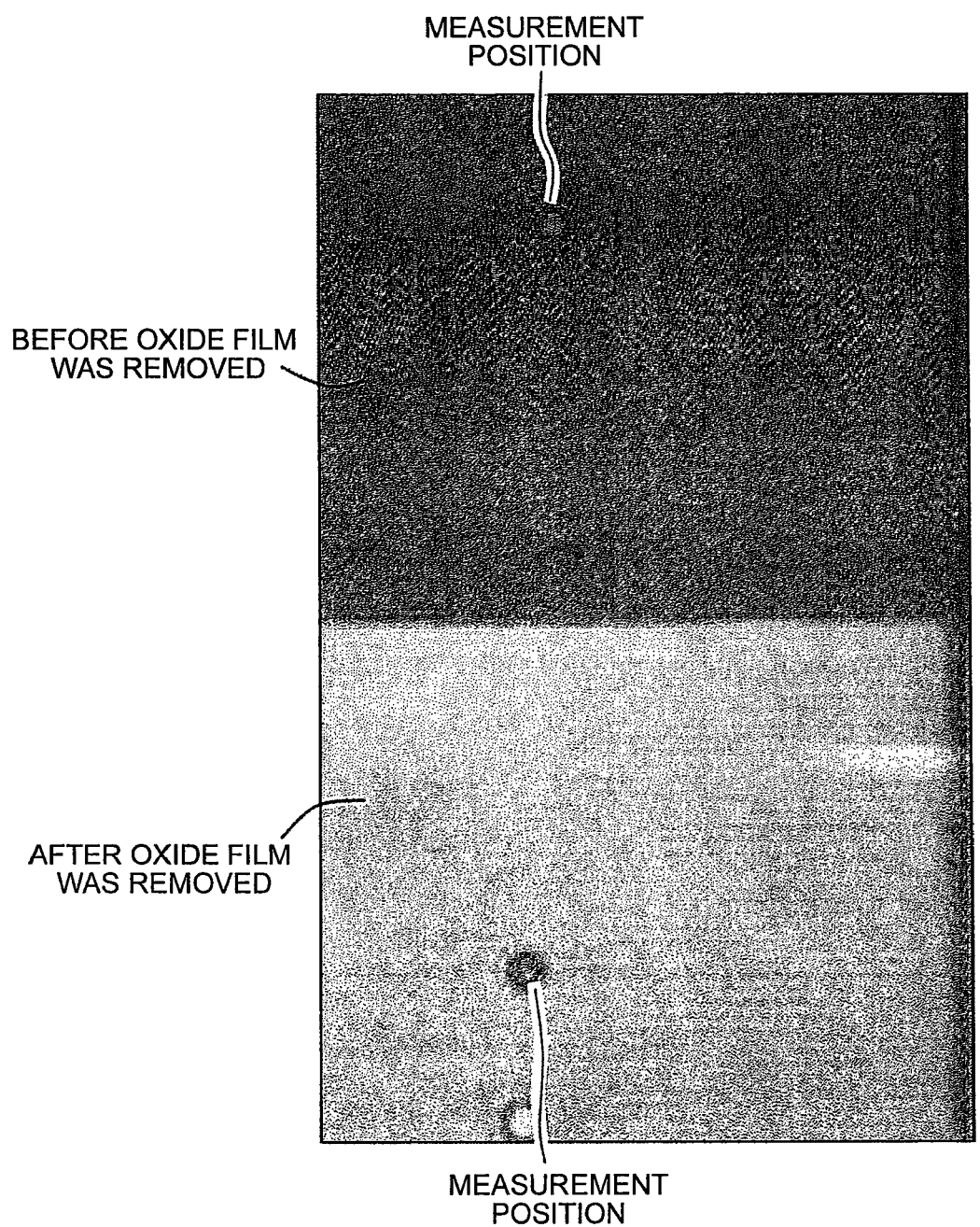
FIG. 4 is an image illustrating a surface of the galvanized steel sheet according to Example 1 before and after an oxide film was removed.

FIG. 4 is an image illustrating a surface of the galvanized steel sheet according to Example 1 before and after an oxide film was removed. The surface of the galvanized steel sheet on which the oxide film was formed exhibited colors of yellow to brown which were colors of the oxide film (upper image). On the other hand, after the oxide film was removed, the surface of the galvanized steel sheet exhibited white which was a color of the galvanized layer.

Figure 5A:
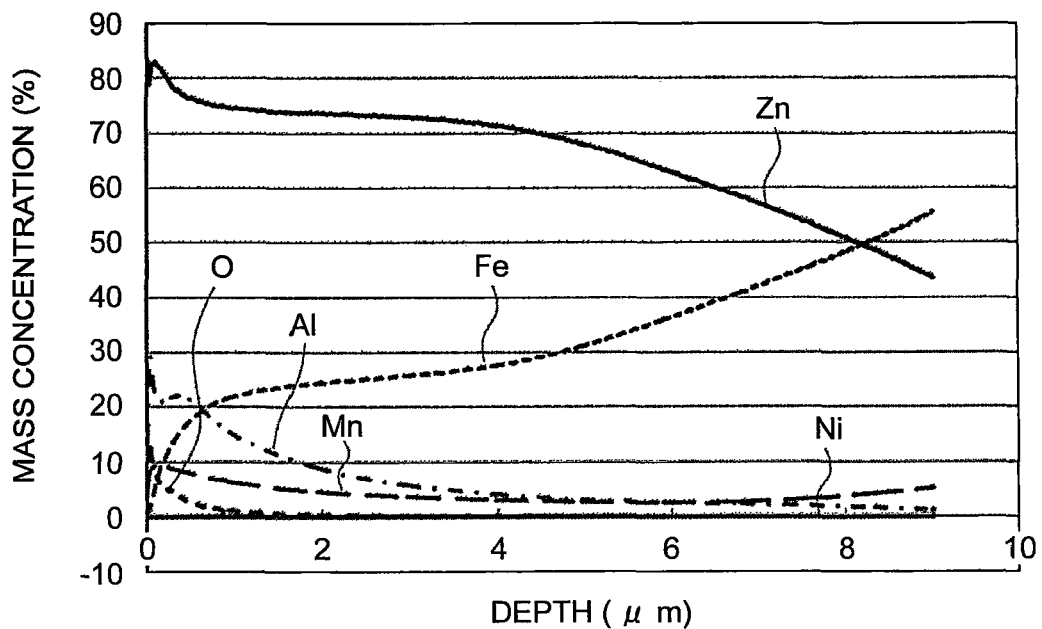
FIG. 5A is a graph illustrating the results of elementary analysis before the oxide film was removed.
Figure 5B:
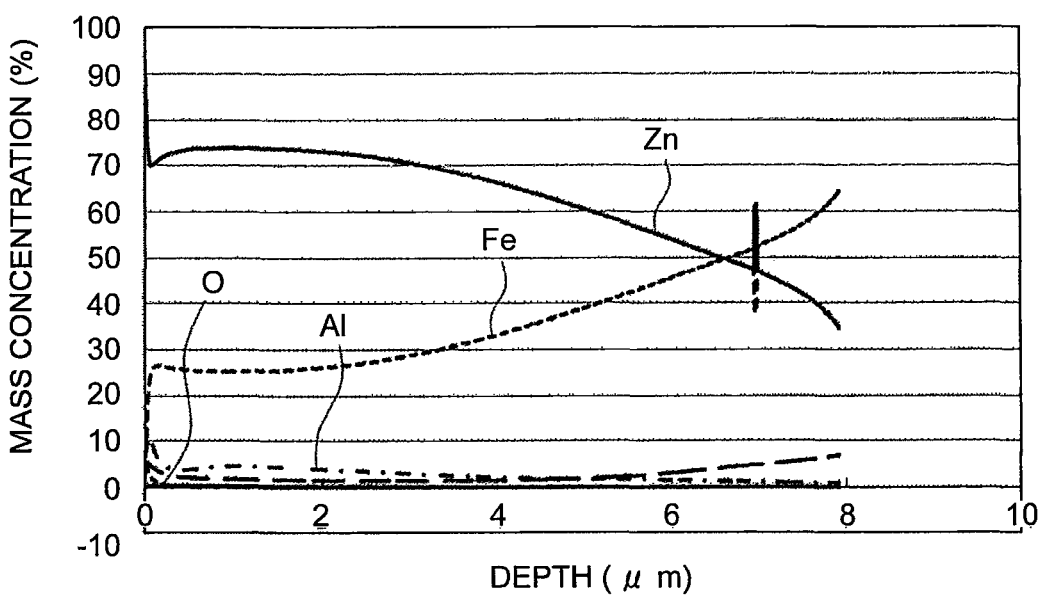
FIG. 5B is a graph illustrating the results of elementary analysis after the oxide film was removed.

At a measurement position illustrated in FIG. 4, the element content was analyzed by high frequency-glow discharge spectroscopy (GDS). FIG. 5A is a graph illustrating the results of elementary analysis before the oxide film was removed, and FIG. 5B is a graph illustrating the results of elementary analysis after the oxide film was removed. It was found from the above results that the oxygen content was decreased from 15 mass % to 5 mass % by irradiation of laser light. Further, by energy dispersive X-ray spectroscopy (EDX), the elementary analysis was performed on the surface of the galvanized steel sheet before and after the oxide film was removed.

TABLE 1

| | C | O | F | Al | Si | Cl | Cr | Mn | Fe | Zn |
|---|---|---|---|---|---|---|---|---|---|---|
| Before Removal (mass %) | 6.4 | 14.7 | 0.3 | 1.2 | 0.1 | 0.1 | 0.1 | 5.3 | 9.3 | 62.4 |
| After Removal (mass %) | 5.8 | 2.8 | — | 0.4 | — | — | — | — | 26.3 | 64.8 |

As clearly seen from the above results, it was found that the oxygen content was decreased from 15 mass % to about 3 mass % by irradiation of laser light.

Figure 6A:
FIG. 6A is a cross-sectional image before the oxide film was removed.
Figure 6B:
FIG. 6B is a cross-sectional image after the oxide film was removed.

FIG. 6A is a cross-sectional image before the oxide film was removed, and FIG. 6B is a cross-sectional image after the oxide film was removed. As illustrated in FIGS. 6A and 6B, the oxide film was removed by irradiation of laser light.

Therefore, it can be considered that, after the oxide film was removed, oxygen was contained during irradiation of laser light.

Figure 7:
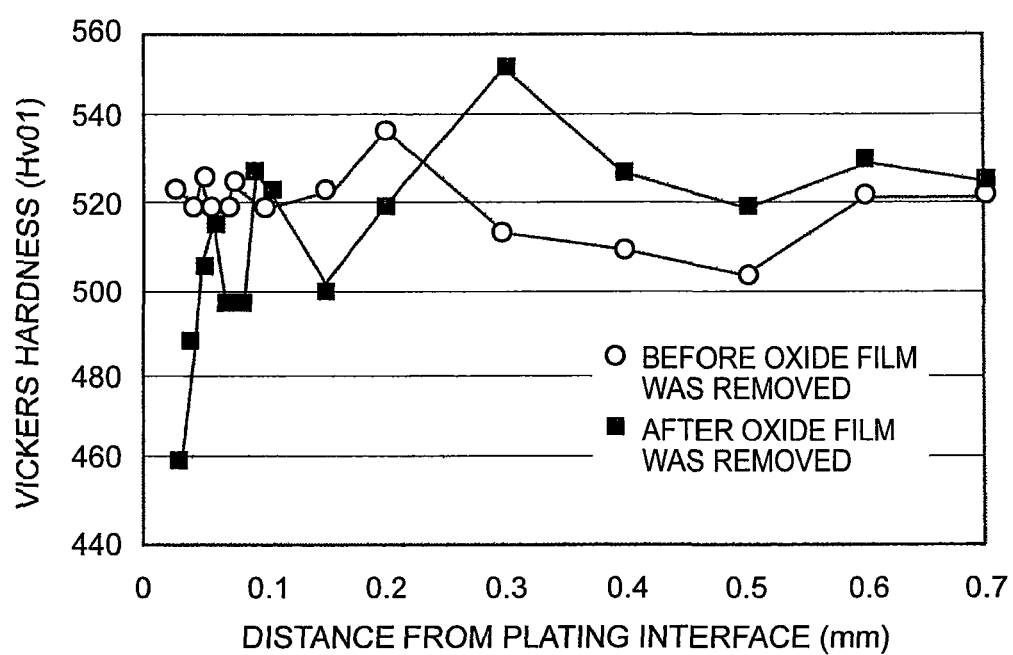
FIG. 7 is a graph illustrating the results of measuring the Vickers hardness of the galvanized steel sheet before and after the oxide film was removed.

FIG. 7 is a graph illustrating the results of measuring the Vickers hardness of the galvanized steel sheet before and after the oxide film was removed. The Vickers hardness was measured from an interface between the galvanized layer and the base material to the inside of the base material. It can be considered from the above results that, after the oxide film was removed, the surface of the steel sheet was slightly softened by irradiation of laser light, but there were substantially no effects on the strength of the steel sheet.

<Phosphate Chemical Conversion Treatment>

A phosphate chemical conversion treatment was performed on the surface of the galvanized layer of the galvanized steel sheet from which the oxide film was removed, and then the coating weight of the phosphate chemical conversion film was measured. The coating weight of the phosphate chemical conversion film was measured by X-ray fluorescence spectrometry according to JIS K 0119. The results are shown in Table 2.

<Formation of Coating Film and Peeling Test>

Cationic electrodeposition coating (target thickness: 10 μm) was performed on the obtained galvanized steel sheet on which the phosphate chemical conversion film was formed, thereby preparing a specimen. Using a salt water immersion test machine, the galvanized steel sheet was dipped in warm water having a salt concentration of 0.1% or higher and a temperature of 40° C. or higher for 200 hours or longer, and the adhesion of the coating film was evaluated using an adhesive tape. The results are shown in Table 2. Here, a peeling area ratio shown in Table 2 is obtained by dividing the area of a peeled part of the coating film by the area of the specimen.

conversion film was measured before coating, and the peeling area thereof was measured after coating. The results are shown in Table 2.

Comparative Example 1

A galvanized steel sheet corresponding to a hot-stamped article was prepared with the same method as Example 1. A phosphate chemical conversion treatment was performed on a surface of the galvanized steel sheet, and a coating film was formed thereon, thereby preparing a specimen. The peeling test was performed using the coating film of the specimen. Comparative Example 1 was different from Example 1, in that an oxide film was not removed by laser light. With the same method as Example 1, the coating weight of the phosphate chemical conversion film was measured before coating, and the peeling area thereof was measured after coating. The results are shown in Table 2.

Comparative Example 2

A galvanized steel sheet corresponding to a hot-stamped article was prepared with the same method as Example 1. A phosphate chemical conversion treatment was performed on a surface of the galvanized steel sheet, and a coating film was formed thereon, thereby preparing a specimen. The peeling test was performed using the coating film of the specimen. Comparative Example 2 was different from Example 1, in that the oxide film was removed not by laser light but by dry ice shot blasting. Specifically, the oxide film was removed under conditions of an air pressure of 0.6 MPa, a processing speed of 10 mm/sec, a dry ice pellet consumption rate of 1 kg/min, and a pellet size of 3 mm. With the same method as Example 1, the coating weight of the phosphate chemical conversion film was measured before

TABLE 2

| | Heating Conditions | Removal Means | Laser Light Conditions | Coating Weight | Peeling Area Ratio |
|---|---|---|---|---|---|
| Example 1 | Heating Temperature 900° C. Holding Time 10 Seconds | Laser Light | 350 MW/cm² | 2.44 g/cm² | 4.6% |
| Example 2 | | Laser Light | 280 MW/cm² | 2.40 g/cm² | 13.1% |
| Example 3 | | Laser Light | 210 MW/cm² | 2.68 g/cm² | 42.7% |
| Comparative Example 1 | | None | — | 2.12 g/cm² | 54.7% |
| Comparative Example 2 | | Blasting | — | 2.55 g/cm² | 48.3% |
| Comparative Example 3 | | Reinforced Alkali | — | 2.24 g/cm² | 56.1% |
| Comparative Example 4 | | Polishing | — | 2.24 g/cm² | 45.0% |
| Reference Example | None | None | — | 2.48 g/cm² | 13.2% |

Examples 2 and 3

Galvanized steel sheets corresponding to hot-stamped articles were prepared with the same method as Example 1. A phosphate chemical conversion treatment was performed on a surface of each of the galvanized steel sheets, and a coating film was formed thereon, thereby preparing a specimen. The peeling test was performed using the coating film of the specimen. Examples 2 and 3 were different from Example 1, in that the irradiation intensity of laser light was changed as shown in Table 2. With the same method as Example 1, the coating weight of the phosphate chemical coating, and the peeling area thereof was measured after coating. The results are shown in Table 2.

Comparative Example 3

A galvanized steel sheet corresponding to a hot-stamped article was prepared with the same method as Example 1. A phosphate chemical conversion treatment was performed on a surface of the galvanized steel sheet, and a coating film was formed thereon, thereby preparing a specimen. The peeling test was performed using the coating film of the specimen. Comparative Example 3 was different from Example 1, in that the oxide film was removed not by laser light but by reinforced alkali. Specifically, the galvanized steel sheet was dipped in an aqueous NaOH solution having a concentration of 2% and a temperature of 50° C. for 30 minutes to remove the oxide film. With the same method as Example 1, the coating weight of the phosphate chemical conversion film was measured before coating, and the peeling area thereof was measured after coating. The results are shown in Table 2.

Comparative Example 4

A galvanized steel sheet corresponding to a hot-stamped article was prepared with the same method as Example 1. A phosphate chemical conversion treatment was performed on a surface of the galvanized steel sheet, and a coating film was formed thereon, thereby preparing a specimen. The peeling test was performed using the coating film of the specimen. Comparative Example 4 was different from Example 1, in that the oxide film was removed not by laser light but by an abrasive. Specifically, the oxide film was removed by using Scotch Bright #300 (manufactured by 3M) as an abrasive under a condition of a polishing time of 5 seconds. With the same method as Example 1, the coating weight of the phosphate chemical conversion film was measured before coating, and the peeling area thereof was measured after coating. The results are shown in Table 2.

Reference Example

A phosphate chemical conversion treatment was performed on a surface of a galvanized steel sheet which was not heated, and a coating film was formed thereon, thereby preparing a specimen. The peeling test was performed using the coating film of the specimen. That is, in Reference Example, since the galvanized steel sheet was not heated, an oxide film was not formed on the surface of the galvanized layer. With the same method as Example 1, the coating weight of the phosphate chemical conversion film was measured before coating, and the peeling area thereof was measured after coating. The results are shown in Table 2.

Results and Discussions

As shown in Table 2, when the oxide film was removed by laser light as in the case of Examples 1 to 3, the coating weight of the phosphate chemical conversion film was the same as that of Reference Example in which a heat treatment was not performed. In addition, the peeling area ratios of the galvanized steel sheets according to Examples 1 to 3 were lower than those according to Comparative Examples 1 to 4. Therefore, it can be said that the adhesion of the coating films of the galvanized steel sheets according to Examples 1 to 3 were higher than those according to Comparative Examples 1 to 4.

Figure 8A:
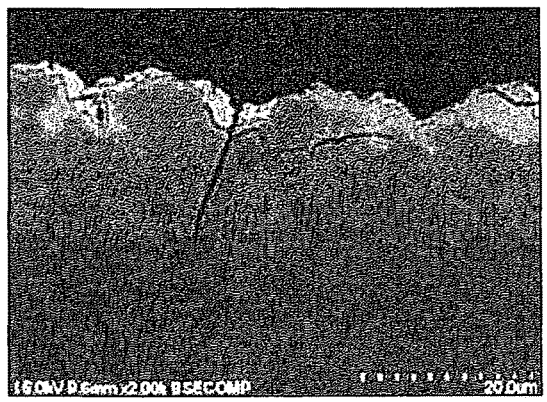
FIG. 8A is a cross-sectional image illustrating a galvanized steel sheet according to Comparative Example 1 after an oxide film was removed.

When the oxide film was not removed as in the case of Comparative Example 1, the coating weight of the phosphate chemical conversion film was less than those of Examples 1 to 3. The reason is considered to be that the formation of the phosphate chemical conversion film was inhibited by the oxide film. Further, in Comparative Example 1 (FIG. 8A), since the gaps were formed between the galvanized layer and the oxide film, salt water infiltrated into these gaps, and corrosion was developed. It is considered that the peeling area ratio was higher than those of Examples 1 to 3 for the above-described reason.

Figure 8B:
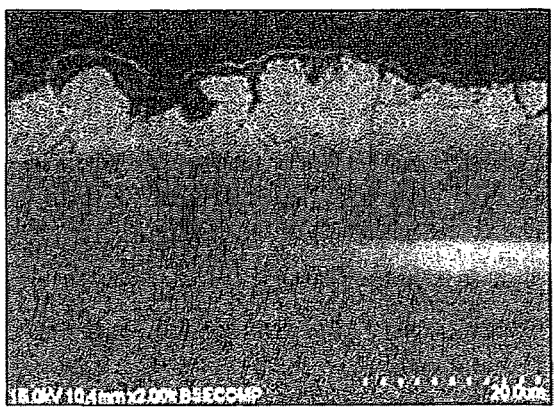
FIG. 8B is a cross-sectional image illustrating a galvanized steel sheet according to Comparative Example 2.

In addition, in the galvanized steel sheet according to Comparative Example 2, the oxide film was removed by the dry ice pellet, and thus the coating weight of the phosphate chemical conversion film increased. However, the oxide film was crushed, and a part of the oxide film and the gaps remained in the galvanized steel sheet (refer to FIG. 8B). Therefore, it is considered that the peeling area ratio was higher than those of Examples 1 to 3 for the above-described reason.

Figure 8C:
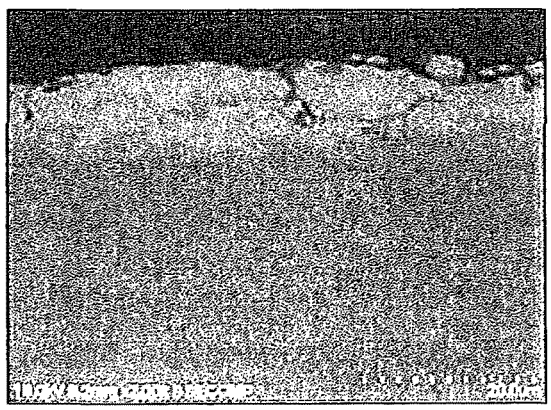
FIG. 8C is a cross-sectional image illustrating a galvanized steel sheet according to Comparative Example 3.
Figure 9A:
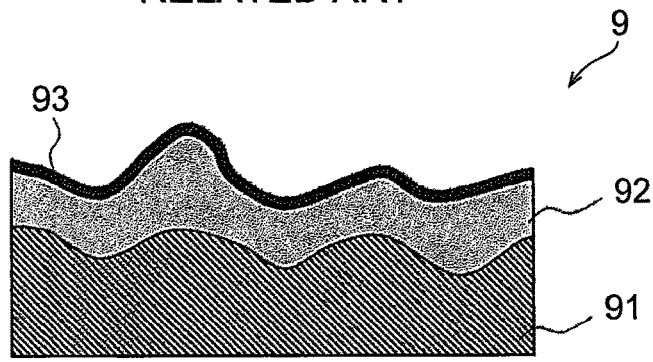
FIG. 9A is a diagram illustrating a forming process by hot stamping in a method of producing a hot-stamped article of the related art.
Figure 9B:
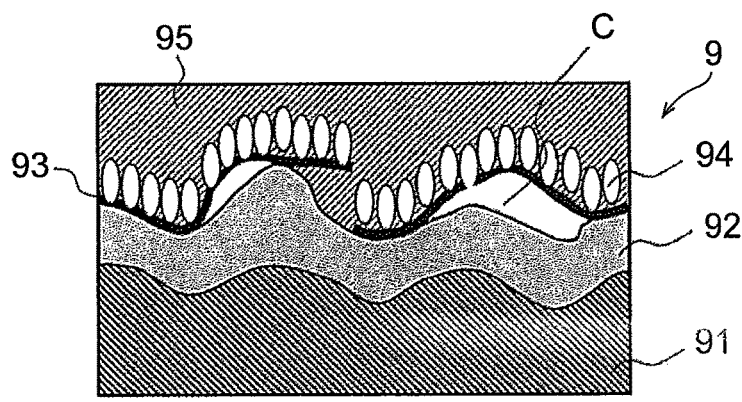
FIG. 9B is a diagram illustrating a coating process in the method of producing a hot-stamped article of the related art.
Figure 9C:
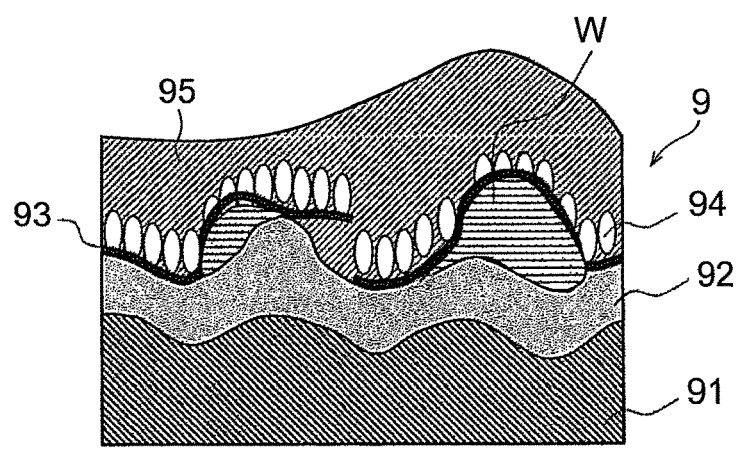
FIG. 9C is a diagram illustrating a state of a galvanized steel sheet after the coating process in the method of producing a hot-stamped article of the related art.

In addition, in the galvanized steel sheet according to Comparative Example 3 (FIG. 8C), the oxide film was removed by reinforced alkali. However, when reinforced alkali is used to uniformly remove the entire surface of the oxide film, there is a concern that the galvanized layer may also be removed. Accordingly, it is considered that a part of the oxide film, and the gaps remained in the galvanized steel sheet, and thus the peeling area ratio was higher than those of Examples 1 to 3.

In addition, in the galvanized steel sheet according to Comparative Example 4, the oxide film was removed by physical polishing. In this case, a part of the oxide film remained in the galvanized steel sheet in a state of being crushed. Accordingly, it is considered that a part of the oxide film and the gaps remained in the galvanized steel sheet, and thus the peeling area ratio was higher than those of Examples 1 to 3.

Hereinabove, the embodiment of the invention has been described. However, the invention is not limited to the above-described embodiment, and various design modifications can be made.

What is claimed is:

1. A method of producing a hot-stamped article, comprising:
   a forming process of heating a galvanized steel sheet on which a galvanized layer is formed and forming the heated galvanized steel sheet by hot stamping;
   a removal process of irradiating, after the forming process, an oxide film formed on a surface of the galvanized layer with laser light to remove the oxide film; and
   a coating process of performing, after the removal process, a coating treatment on the galvanized steel sheet formed by hot stamping, wherein
   the laser light is irradiated at a power from 210 to 350 $MW/cm^2$.

2. The method according to claim 1, wherein
   in the coating process, a phosphate chemical conversion treatment is performed on the surface of the galvanized layer from which the oxide film is removed, and a coating film is formed on the surface on which the phosphate chemical conversion treatment is performed.

* * * * *